(12) United States Patent
Niklewicz

(10) Patent No.: US 11,795,985 B2
(45) Date of Patent: Oct. 24, 2023

(54) ASSISTED REMOVAL FASTENER SYSTEM

(71) Applicant: Kwikbolt Limited, Kingston Upon Thames (GB)

(72) Inventor: Jan Niklewicz, Kingston Upon Thames (GB)

(73) Assignee: KWIKBOLT LIMITED, Kingston Upon Thames (GB)

( * ) Notice: Subject to any disclaimer, the term of this patent is extended or adjusted under 35 U.S.C. 154(b) by 435 days.

(21) Appl. No.: 16/379,916

(22) PCT Filed: Oct. 6, 2017

(86) PCT No.: PCT/IB2017/056190
§ 371 (c)(1),
(2) Date: Apr. 10, 2019

(87) PCT Pub. No.: WO2018/069803
PCT Pub. Date: Apr. 19, 2018

(65) Prior Publication Data
US 2019/0338799 A1    Nov. 7, 2019

(30) Foreign Application Priority Data

Oct. 12, 2016 (GB) ................................. 1617279

(51) Int. Cl.
*F16B 19/10* (2006.01)
*B25B 31/00* (2006.01)
(Continued)

(52) U.S. Cl.
CPC .......... *F16B 19/109* (2013.01); *B25B 31/005* (2013.01); *F16B 13/0833* (2013.01); *F16B 21/16* (2013.01); *F16B 23/0084* (2013.01)

(58) Field of Classification Search
CPC .. F16B 13/066; F16B 19/1054; F16B 19/109; F16B 23/0084; F16B 19/1072; B21J 15/32; B25B 23/10; B25B 23/0085
(Continued)

(56) References Cited

U.S. PATENT DOCUMENTS 3,042,094 A * 7/1962 Liljeberg ................ F16B 35/04
                                                              411/271
3,136,203 A * 6/1964 Davis .................. F16B 19/1072
                                                              411/38
(Continued)

FOREIGN PATENT DOCUMENTS

DE    202012007471 U1    8/2012
GB          151446 A     9/1920
(Continued)

OTHER PUBLICATIONS

International Search Report and Written Opinion of International Searching Authority for PCT Application No. PCT/IB2017/056190 dated Jan. 16, 2018.
(Continued)

*Primary Examiner* — Flemming Saether
(74) *Attorney, Agent, or Firm* — Schott, PC.

(57) ABSTRACT

The present invention is concerned with improvements to removable fasteners and particularly relates to removable and re-usable fasteners with features that allow them to be gripped and handled positively. The present invention therefore provides a fastening system comprising a fastener and a tool, the tool being suitable for installing and removing the fastener from an aperture in a work-piece, wherein the fastener has a main body and a head at one end, and wherein the head of the fastener and the tool have grip features that allow the fastener to be releasably locked to the tool to prevent separation of the fastener and tool during installation and removal of the fastener. This allows the fastener to be
(Continued)

handled positively without fear of the fastener becoming misaligned, or dropping off the tool.

1 Claim, 12 Drawing Sheets

(51) Int. Cl.
  *F16B 21/16* (2006.01)
  *F16B 23/00* (2006.01)
  *F16B 13/08* (2006.01)
(58) Field of Classification Search
  USPC .................................................. 411/55, 407
  See application file for complete search history.

(56) References Cited

U.S. PATENT DOCUMENTS

| | | | | |
|---|---|---|---|---|
| 3,139,675 | A * | 7/1964 | Devine | B25B 13/488 |
| | | | | 29/240 |
| 3,604,487 | A * | 9/1971 | Gilbert | F16B 23/0007 |
| | | | | 81/443 |
| 3,779,105 | A * | 12/1973 | Triplett | B25B 27/0007 |
| | | | | 81/124.5 |
| 4,466,314 | A * | 8/1984 | Rich | B25B 13/486 |
| | | | | 81/177.85 |
| 5,375,956 | A * | 12/1994 | Pennig | A61B 17/8605 |
| | | | | 411/389 |
| 5,554,191 | A * | 9/1996 | Lahille | A61B 17/1757 |
| | | | | 623/17.11 |
| 8,430,001 | B2 * | 4/2013 | Ortiz | B25B 13/06 |
| | | | | 81/124.1 |
| 8,459,155 | B2 * | 6/2013 | Canizares, Jr. | B21K 1/56 |
| | | | | 81/451 |
| 9,709,085 | B2 | 7/2017 | McClure | |
| 2004/0022596 | A1 * | 2/2004 | Belanger | F16B 19/1063 |
| | | | | 411/34 |
| 2012/0230796 | A1 | 9/2012 | McClure | |
| 2013/0125714 | A1 * | 5/2013 | Dahners | A61B 17/8888 |
| | | | | 81/451 |
| 2020/0290180 | A1 * | 9/2020 | Palette | F16B 19/109 |

FOREIGN PATENT DOCUMENTS

| | | |
|---|---|---|
| GB | 619794 A | 3/1949 |
| GB | 1514446 A | 6/1978 |
| GB | 2515314 A | 12/2014 |
| GB | 2515314 B | 7/2015 |
| GB | 2529634 A | 3/2016 |
| GB | 2529634 B | 4/2017 |

OTHER PUBLICATIONS

International Preliminary Report on Patentability for PCT Application No. PCT/IB2017/056190 dated Feb. 4, 2019.

* cited by examiner

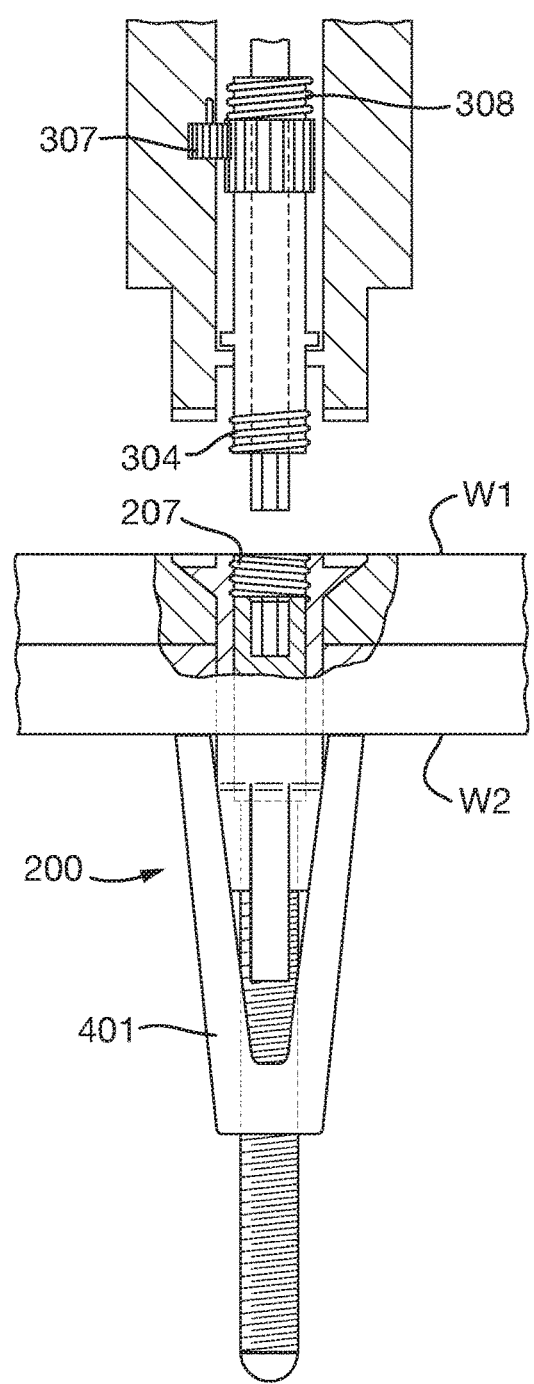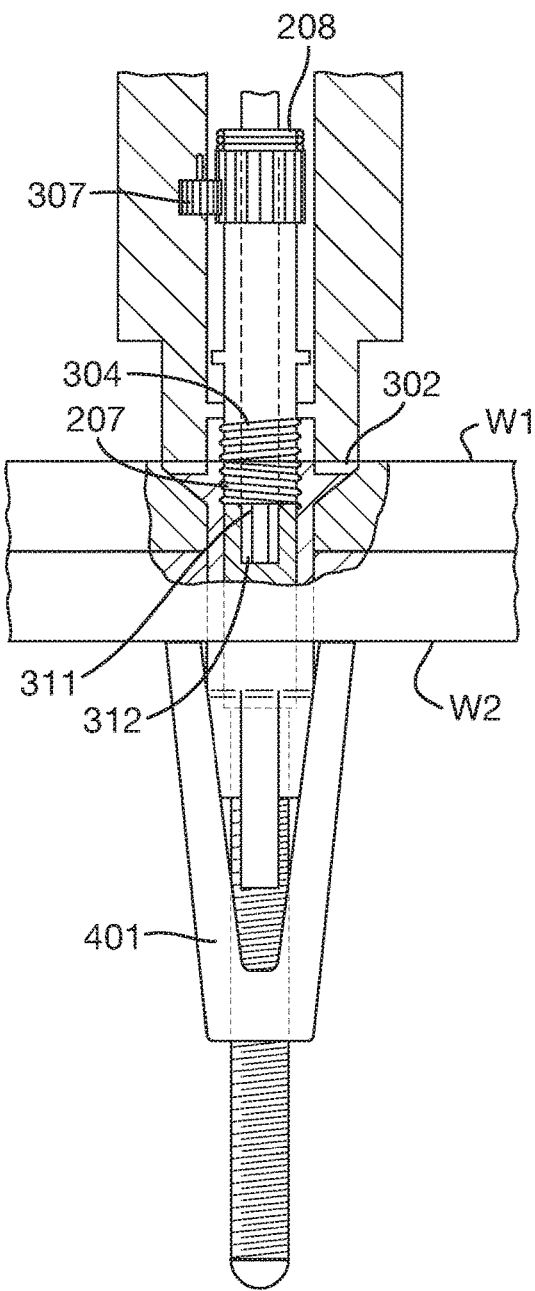

ASSISTED REMOVAL FASTENER SYSTEM

BACKGROUND

Field of the Invention

The present invention is concerned with improvements to removable fasteners and particularly relates to removable and re-usable fasteners with features that allow them to be gripped and handled positively.

Description of Related Art

In the manufacture of complex structures such as aircraft frames, removable blind fasteners are used as a temporary fixing. The temporary fixing helps to align the components. After inspection and adjustment as required the removable blind fasteners are removed and permanent blind fasteners installed in the apertures.

High performance structures, such as those found on modern aircraft, require high precision fabrication techniques. During assembly of, for example, aircraft structures, a series of holes are drilled through the component materials, and permanent fastenings such as rivets are placed and secured. For small structures clamping of the component materials can be along the edge of the materials. For large structures however it is not possible to achieve accurate alignment with this technique. For the assembly of large structures a series of clamping holes are drilled at selected points across the structure. Temporary fasteners are inserted into these holes to secure the component materials while further holes are drilled to receive permanent rivet fasteners. When rivets have been placed and secured the temporary fasteners are removed and subsequently replaced with permanent rivet fastenings. The number and location of the temporary fastenings will vary between applications, but for a typical wing set, i.e. two complete wings, for a large commercial passenger aircraft, the number of temporary fastenings used can reach around 25,000. It is convenient for such temporary fasteners to be operated from one side of the work-piece only, i.e. to insert and activate the fastener from above the work-piece without having to perform an operation on the underside of the work-piece, for instance screwing or tightening. Not only does one-sided operation simplify the assembly process, it is often the case that the underside of a work-piece is not accessible at all.

Fasteners that are operable from a single side of the work-piece are termed "blind" fasteners.

Modern aircraft assembly techniques use robotic equipment to install and remove temporary fasteners to increase assembly speeds and accuracy.

Robotic equipment is particularly suitable for managing the high number of fasteners that are used.

Conventional blind fasteners, for example those described in GB151446, DE202012007471, GB2529634 and GB2515314, can be of three parts, as shown in FIGS. 1A and 1B. The three parts include an upper dowelling part 101 that is a close fit with the aperture in the materials to be fastened, a lower clamping part 102 that expands to clamp the materials together and a threaded member 103 that actuates the clamping part on rotation. FIG. 1A shows a blind fastener having a clamping part with legs pointing away from the dowelling part. FIG. 1B shows a blind fastener having a clamping part with legs pointing towards the dowelling part.

The upper dowelling part 101 of each fastener has essentially two regions; a dowelling region 104, of a cylindrical section with parallel walls that is inserted into the aperture in the work-piece; and a head region 105 for handling and operating the fastener 100. The head region includes a head 106 of diameter greater than the dowelling region 104. The head is countersunk and has an underside that provides a reactive surface to apply clamping load against the clamping action of the legs. The top surface of the head 106 has a series of anti-rotation grooves 107 that are arranged to receive a tool for preventing the fastener from rotating when the threaded member 103 is rotated. The head 106 also has a recess for receiving the threaded member 103. The threaded member 103 also has a head 108. The head 108 of the threaded part 103 has a hexagonal recess 109 for receiving a tool to turn the threaded member 103. The installation sequence is shown in FIGS. 1D to 1G. Countersunk aperture A1 in work-piece W1 is aligned with the aperture A2 in work-piece W2 and the fastener 100 inserted through the aligned apertures, as shown in FIG. 1D. The fastener 100 is inserted into the aligned apertures and a tool (not shown) used to turn the threaded member 103. This brings the leg part 102 up towards the work-pieces W1, W2 and simultaneously opens the legs, as shown in FIG. 1E. The leg part 102 eventually engages with the underside of work-piece W2, as shown in FIG. 1F, and further turning of the threaded member 102 causes the legs 102 to provide an opposing reactive force against the head 106 and thus clamp the work-pieces W1, W2 together, as shown in FIG. 1G.

To remove the fastener 100, a tool is used to turn the threaded member 103 in the opposite direction and release the legs, so that they contract and the fastener 100 can be removed from the aperture. The fastener is removed by inclining the tool slightly to get a grip on the threaded member hexagonal recess 109, so that when the tool is moved away, it brings the fastener 100 out with it a short distance; the fastener 100 can then pulled all the way out by hand, or another tool used to grip the fastener 100 more positively. A problem here is that if the fastener 100 becomes stuck in the aperture for any reason, for example if adhesive is used between the work-pieces being clamped or swarf (debris from drilling the aperture) clogs the aperture, then the force that can be applied on the threaded member 103 by tilting the tool is not sufficient to remove it. Other removal techniques then need to be applied, such as tapping from the reverse (assuming the reverse side is accessible) or prising the fastener out, both of which are undesirable because they take time and can damage the aircraft structure.

Fasteners that do not have a flush head, but instead have a raised hex head, such as that shown in FIG. 1C offer a better opportunity to grip the fastener 100 because more of the fastener is above the work-piece. A human operator can grip the fastener by hand. However, in the case of fasteners inserted and removed by robotic equipment, there may still not be enough surface to provide a positive grip on the fastener to remove it completely and transport it to the next location. Conventional fasteners used with robotic equipment need to have a large head that sits above the work-piece so that the automated equipment can positively grip the fastener, but this head presents an obstacle to the swift movement of the robotic equipment across the structure being assembled and complexity is added to the programming of the equipment to avoid these obstacles.

It is therefore an object of the present invention to overcome these problems with conventional removable blind fasteners.

SUMMARY OF THE INVENTION

The present invention therefore provides a fastening system comprising a fastener and a tool, the tool being suitable for installing and removing the fastener from an aperture in a work-piece, wherein the fastener has a main body and a head at one end, and wherein the head of the fastener and the tool have grip features that allow the fastener to be releasably locked to the tool to prevent separation of the fastener and tool during installation and removal of the fastener. This allows the fastener to be handled positively without fear of the fastener becoming misaligned, or dropping off the tool.

The fastener and the tool may have corresponding grip features to allow the tool to be mechanically locked to the fastener. Mechanical locking allows the connection and release of the fastener and tool to be straightforward.

The head of the fastener may include an undercut feature in a radial direction, perpendicular to the longitudinal axis of the fastener, and wherein the tool may include a projection in a radial direction for mechanically engaging with the undercut feature of the fastener. The head of the fastener may include a projection in a radial direction, perpendicular to the longitudinal axis of the fastener, and wherein the tool may include an undercut feature for mechanically engaging with the projection of the fastener. Mechanical locking using features of undercut and projection in a radial direction, perpendicular to the longitudinal direction of the fastener, means that, when force is applied in a longitudinal direction to the tool to remove the fastener, the undercut and projection features engage with each other and the longitudinal force can be transmitted from the tool to the fastener, and this force can be relatively high, for example to overcome binding of the fastener in an aperture. When the fastener and tool are mechanically locked, the fastener can be moved around by the tool and held in vertical and horizontal positions prior to insertion. This is beneficial in robotic applications where the store of fasteners is remote from the installation point or the work-piece is oriented vertically or upside-down.

The projection or undercut of the fastener may be provided in a recess in the head of the fastener that is coaxial with the longitudinal axis of the fastener. This means that no features are required above the head of the fastener, with the grip features provided below the top surface of the head of the fastener. This is desirable because it maintains a low profile for the fastener, which would otherwise get in the way of robotic equipment.

The projection or undercut of the fastener may be an internal thread in the recess in the head of the fastener and the projection or undercut of the tool is a corresponding external thread. Threaded grip features provide a positive lock to which a large degree of longitudinal force can be applied.

The undercut feature and projection may be arranged as a bayonet type fitting. This enables the fastener and tool to be quickly locked or unlocked with a small degree of rotation of the tool.

The undercut feature may be at least one oblique channel in the head of the fastener. This removes the need for rotational movement of the tool.

The head of the fastener may be countersunk and the fastener grip feature provided flush with the head of the fastener. This allows the fastener to remain flush with the top surface of the work-piece and therefore present no protruding features that can otherwise interfere with the operation of robotic equipment. Previously, it has not been possible to use conventional countersunk-headed fasteners with robotic equipment because of the problem of extraction, i.e. being able to grip the fastener well enough to pull it out of an aperture. The extraction problem has been solved conventionally by providing fasteners with protruding heads, and programming the robotic equipment to move around the protruding heads. The present invention solves the extraction problem by providing a releasable locking feature that can be located within the head itself and therefore different configurations of fastener heads are possible, including those with countersunk heads.

The grip feature may be a bayonet fitting comprised of grooves on the external face of the head, which in this case would not be flush with the work-piece. This embodiment is beneficial because the added surface area allows a high longitudinal extraction force to be applied if required.

Anti-rotation features may be provided in the head of the fastener and on the tool for preventing rotation of the fastener during installation or removal. These may comprise radially extending slots in the head of the fastener.

The fastener may include a clamping part axially aligned with and extending away from the head of the main body, and a threaded screw member axially aligned with and passing through the main body and engaging with a threaded part of the clamping portion, such that turning the screw member causes the clamping part to move relative to the main body, wherein the grip feature may be independent of the screw member of the fastener. This allows flexibility in the location of the grip feature, which may be adapted to suit a particular application.

The tool may have a rotatable screw member engaging part for engaging with the screw member of the fastener and an independent grip feature engaging part for engaging with the grip feature of the fastener. The fastener may therefore be handled independently of the operation of the fastener, i.e. gripping the fastener with the tool does not operate the fastener.

The grip feature engaging part may be a rotatable sleeve, which allows the screw engaging part of the tool to pass through the centre of the sleeve.

The tool may be provided with an electromagnetic coil to allow the tool to be electromagnetically locked to the fastener.

In a further embodiment, a removable blind fastener is provided, having a main body with a head, a clamping part axially aligned with and extending away from the head of the main body, and a threaded screw member axially aligned with and passing through the main body and engaging with a threaded part of the clamping portion, such that turning the screw member causes the clamping part to move relative to the main body, the fastener characterised in that; the head of the main body has a grip feature to allow the fastener to be mechanically locked to the tool to prevent separation of the fastener and tool during installation and removal of the fastener. The grip feature provides a point where a handling tool can attach to the fastener to allow positive insertion and extraction of the fastener.

The grip feature may be independent of the screw member of the fastener, which allows the screw member to be fully operated and the grip feature to be fully accessed without compromising the operation of either element.

The grip feature of the head of the fastener may include an undercut feature in a radial direction, perpendicular to the longitudinal axis of the fastener or the grip feature of the head of the fastener may include a projection in a radial direction, perpendicular to the longitudinal axis of the fastener.

The grip feature may include a coaxial recess in the head of the fastener. Suitable locations for the grip feature are limited so a special recess in the head can provide a dedicated location for the grip feature.

The recess may have an internal thread. A threaded grip feature provides a positive engagement for the tool.

The head may be countersunk and the grip feature flush with the head.

Removable fasteners with countersunk heads are useful for applications where the fasteners are handled by robotic equipment so the surface of the work-pieces needs to be free from obstructions. A problem with flush fasteners is that there is usually nothing to grip hold of to remove them. This is solved by providing a grip feature that is flush with the head.

Anti-rotation features may be provided in the head of the fastener for preventing rotation of the fastener when the screw is turned.

The grip feature may be a bayonet fitting comprised of grooves on the internal face of the recess. A bayonet fitting has the advantage that only a small twist is required to engage it, rather than multiple turns to engage a threaded grip feature. A bayonet fitting within the recess allows the grip feature to remain flush with the head for use with countersunk fasteners. Alternatively, for a fastener with a raised head, the bayonet fitting may be provided on the outside of the head, allowing the parts of the bayonet to be larger and therefore a greater force to be applied to remove the fastener when necessary.

The grip feature may comprise one or more oblique recesses in the head of the fastener. This has the advantage that the corresponding gripping part in the tool need not rotate or twist at all to engage with the grip feature of the fastener.

In another embodiment of the invention a tool is provided for engaging with a fastener having a grip feature of the type described above, where the tool has a rotatable screw member engaging part for engaging with the screw member of the fastener and a grip feature engaging part for engaging with the grip feature of the fastener. The screw member engaging part and the grip feature engaging part are operable independently and simultaneously, so that when the tool grips the fastener, the clamping part of the fastener can be operated to clamp or release the fastener from apertures in the work-pieces.

The grip feature of the tool may include a projection in a radial direction for mechanically engaging with an undercut feature of the fastener or the tool may include an undercut feature for mechanically engaging with a projection on the fastener.

The grip feature engaging part may be a rotatable threaded sleeve. Rotation of the threaded sleeve into the threaded recess of the fastener causes the fastener and tool to become positively mated together, so that the fastener can be handled using the tool.

The grip feature engaging part could be a bayonet fitting corresponding to a bayonet fitting in the fastener or the grip feature engaging part could be one or more retractable prongs for engaging with oblique recesses in the head of the fastener.

The grip feature may be an electromagnetic coil operable to create a magnetic field for holding the fastener.

The tool may have anti-rotation features for engaging with anti-rotation features of the fastener, so that when the screw member is turned the whole fastener is prevented from rotating.

In a further embodiment, a removable blind fastener is provided having a main body with a head, a clamping part axially aligned with and extending away from the head of the main body, and a threaded screw member axially aligned with and passing through the main body and engaging with a threaded part of the clamping portion, such that turning the screw member causes the clamping part to move relative to the main body, the fastener characterised in that; the head of the main body has a grip feature providing at least one attachment point for positively mating with a handling tool.

BRIEF DESCRIPTION OF THE DRAWINGS

FIGS. 4A to 4E comprise a sequence of cross-sectional views showing the tool shown in FIG. 3 in use to extract the fastener shown in FIG. 2A.

FIG. 8A is a perspective view of an embodiment of the fastener of FIG. 2A having angled recesses in the head as a gripping feature.

DETAILED DESCRIPTION OF THE PREFERRED EMBODIMENT

Figure 2A:
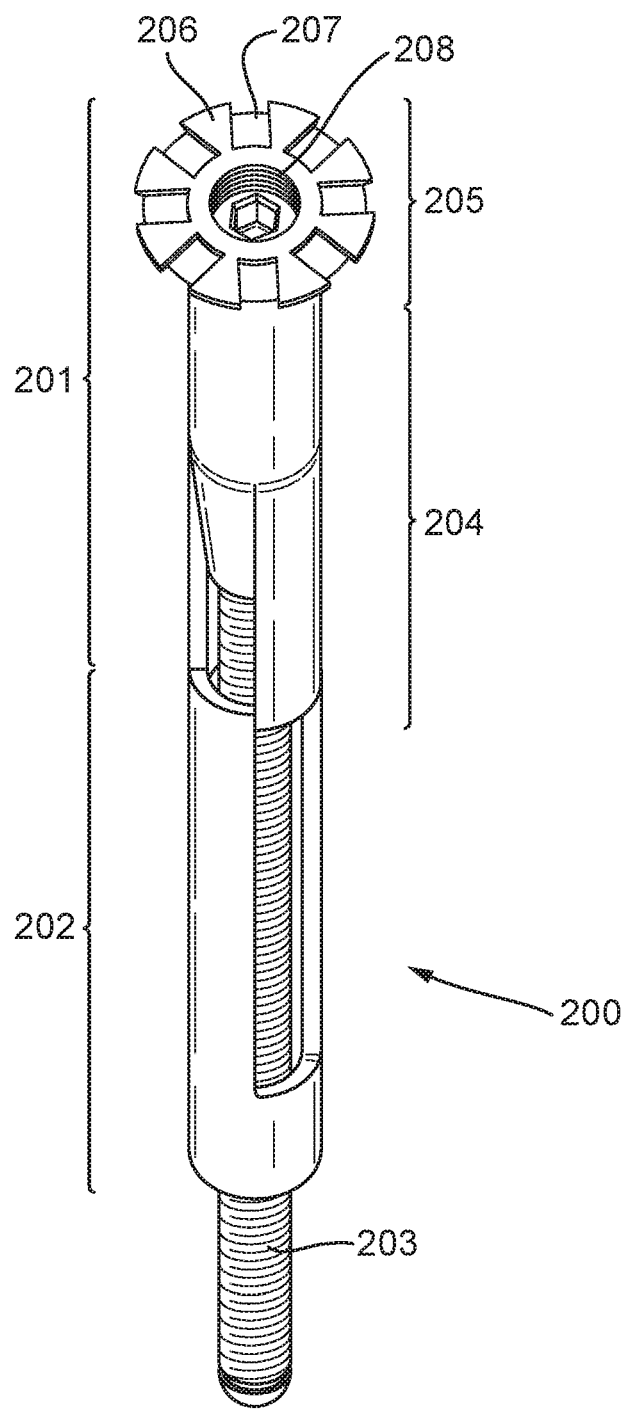
FIG. 2A is a fastener in accordance with an embodiment of the invention.

The present invention involves a feature in the head of a fastener to provide a positive grip for removing the fastener. FIG. 2A shows a three-part removable blind fastener with a grip feature in its head in accordance with an embodiment of the invention. The three parts of the fastener 200 are: a dowelling part 201, a leg part 202 and a threaded member 203. The dowelling part 201 and the leg part 202 are hollow tubular structures, having a longitudinal axis along the length of the tubular structure, and the leg part has an internal threaded region. The threaded member 203, which has an external thread, is arranged to pass through both the dowelling part 201 and the leg part 202, and engage with the internal thread of the leg region 203.

Turning of the threaded member 203 causes the dowelling part 201 and the leg part 202 to be drawn together, and as the leg part 203 engages with the dowelling part 201, legs in the leg part 202 splay outward to provide a clamping surface against the work-pieces being clamped. The upper dowelling part 201 has essentially two regions; a dowelling region 204, of a cylindrical section with parallel walls that fit closely into the aperture in the work-piece; and a head region 205 for handling and operating the fastener 200. The head region includes a countersunk head 206 of diameter greater than the dowelling region 204. The head is countersunk and has an underside that provides a reactive surface to apply clamping load against the clamping action of legs. The top surface of the head 206 has a series of anti-rotation grooves 207 extending radially from the longitudinal axis, that are arranged to receive a tool for preventing the fastener from rotating when the threaded member 203 is rotated. The head 206 also has a recess 208 for receiving the threaded member 203.

Figure 2B:
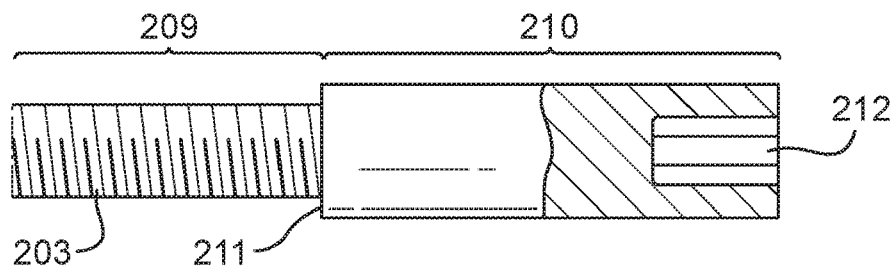
FIG. 2B is a cutaway view of a threaded member component of the fastener shown in FIG. 2A.

The threaded member 203 is shown in more detail in FIG. 2B. The threaded member 203 has two regions; a threaded region 209 that supports the external thread that engages with the internal threaded region of the leg part 202; and a head region 210 of greater diameter than the threaded region 210. The transition from the threaded region 209 to the threaded member head region 210 defines a threaded member bearing surface 211. The head 210 of the threaded part 203 has a hexagonal recess 212 for receiving a tool to turn the threaded member 203.

Figure 2C:
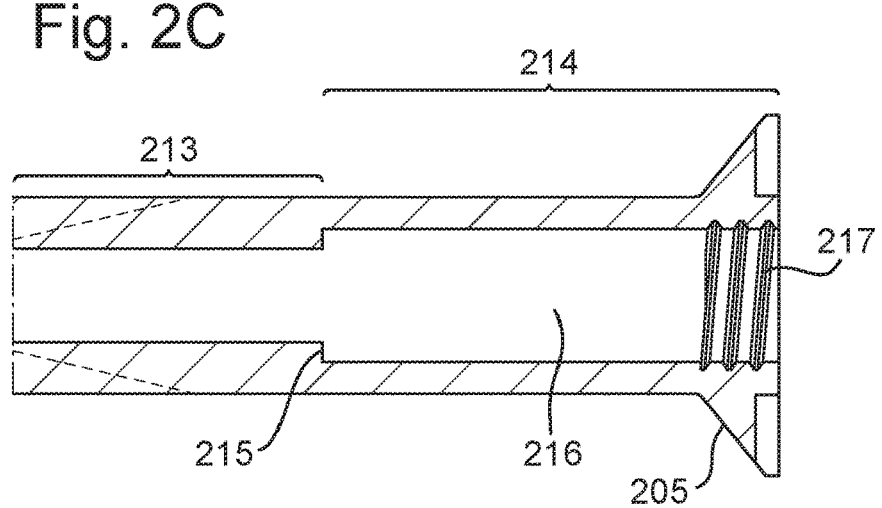
FIG. 2C is a cross-sectional view of a head part of the fastener shown in FIG. 2A.
Figure 2D:
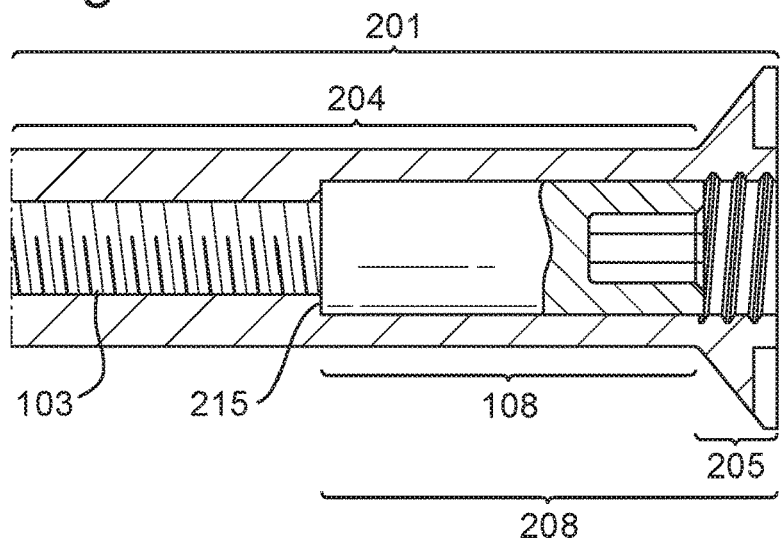
FIG. 2D is a cross-sectional view of the threaded member component shown in FIG. 2B in place within the head part of the fastener shown in FIG. 2C.

The dowelling member 201 is shown in more detail in FIG. 2C. The interior surface of the tubular dowelling part 201 has two regions of differing diameter: a first region 213 furthest away from the dowelling part head 205 of approximately the same diameter as the thread region 209 of the threaded member 203; and a second region 214 closest to the dowelling part head 205 of approximately the same diameter as the thread member head region 210. This second region forms the recess 208 referred to above. The transition between the first region 213 and second region 214 provide a dowelling part bearing surface 215. In use, the threaded member 203 fits within the dowelling part 201 so that the threaded member bearing surface 211 and dowelling part bearing surface 215 bear against each other, as shown in FIG. 2D.

The recess 208 in the dowelling member 201 itself has two regions: a smooth region 216 and a threaded region 217. The smooth region 216 is substantially the same length as the threaded member head region 210 and is arranged so that the threaded member head region 210 can rotate within this smooth region 216. The threaded region 217 has an internal thread and this is the feature that allows the fastener to be gripped. When the threaded member 203 is present in the dowelling part 201, the threaded region 217, also referred to as the grip region 217 is arranged to be clear and accessible to an externally threaded tool and thus provide a positive gripping feature for removal of the fastener. The grip region 217 is long enough to provide a sufficient number of threads to provide a positive grip.

Figure 3:
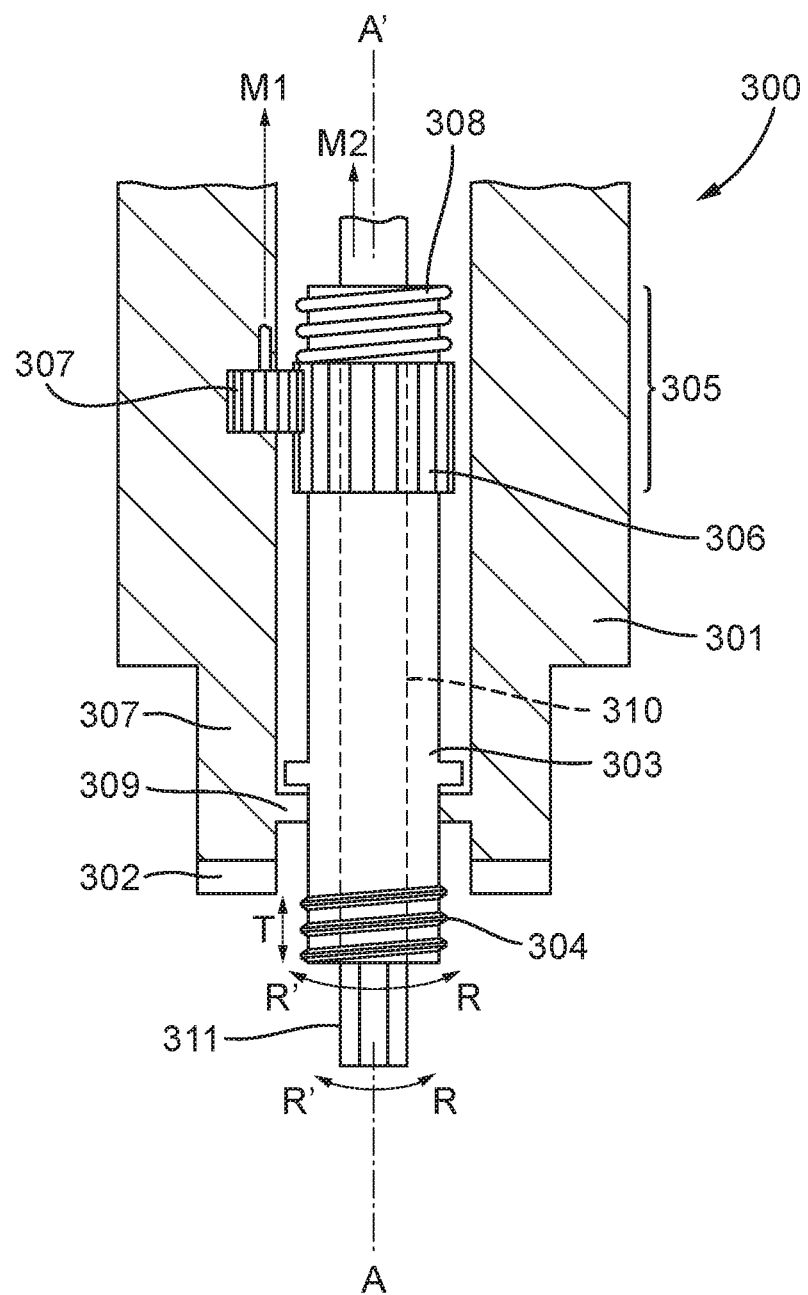
FIG. 3 is a cross-sectional view of a tool in accordance with an embodiment of the invention for installing and extracting fasteners of the type shown in FIG. 2A.

A special tool may be provided for positive insertion and removal of the fastener 200. The operating components of the special tool are shown in FIG. 3. The tool 300 comprises an outer sleeve 301, a gripping collar 303 and a hex tipped shaft 310. Anti-rotation features 302 are provided at one end of the outer sleeve 301 and are arranged to engage with the anti-rotation slots 207 in the head of the fastener 200. Coaxially located within the outer sleeve 301 is a fastener gripping collar 303. The gripping collar 303 has an externally threaded section 304 at one end, which is the same end as the anti-rotation features 302 of the outer sleeve 301. The gripping collar 302 is rotatable about the central axis AA' in direction shown RR'. Rotation of the gripping collar is by means of the drive 305, which comprises a toothed section 306 and cog 307 driven by a motor M1 (not shown). The gripping collar 303 is also translatable in a longitudinal direction T, along the central axis AA'. The toothed section 306 of the gripping collar 303 is wide with respect to the cog 307 to allow translation of the gripping collar 303. A spring 308 is provided to bias the gripping collar 303 out of the outer sleeve 301, up to a stop 309 that prevents the gripping collar 303 from being ejected altogether from the tool 300. Coaxially located within the gripping collar 303 is a hex tipped shaft 310 that protrudes from end of the tool. The shaft 310 is rotatable around the central axis AA' in direction RR'. One end 311 of the shaft 310 has a hexagonal profile for engaging with the hex recess 212 in the head of the threaded member 203. The other end of the shaft 310 is driven by a motor M2 (not shown).

In operation, the fastener 200 and the tool 300 are used cooperatively to tighten and release the fastener, as shown in FIGS. 4A to 4D. The fastener may be loosely in place in the aperture ready to be tightened and fully installed, or it may be installed and ready to be extracted. The description below relates to extraction of an installed fastener; installation is simply the reverse of this procedure.

Initially the tool 300 is aligned with the head end of the fastener 200, as shown in FIG. 4A. The legs 401 of the fastener 200 are wide and clamped tight up against the underside of the work-piece W2. The gripping collar 304 of the tool 300 is protruding from the end of the outer sleeve 301 of the tool 300, biased by the spring 308.

The tool 300 is then brought into engagement with the fastener 200, as shown in FIG. 4B. The anti-rotation features 302 of the tool locate and engage with the anti-rotation features 207 in the head 205 of the fastener 200 and the hex tip 311 of the shaft 310 in the tool 200 engages with the hexagonal recess 212 in the fastener 200. The gripping collar 304 of the tool 300 is no longer protruding from the end of the outer sleeve 301 of the tool 300, but biased into the outer sleeve 301 against the spring 308.

Figure 4C:
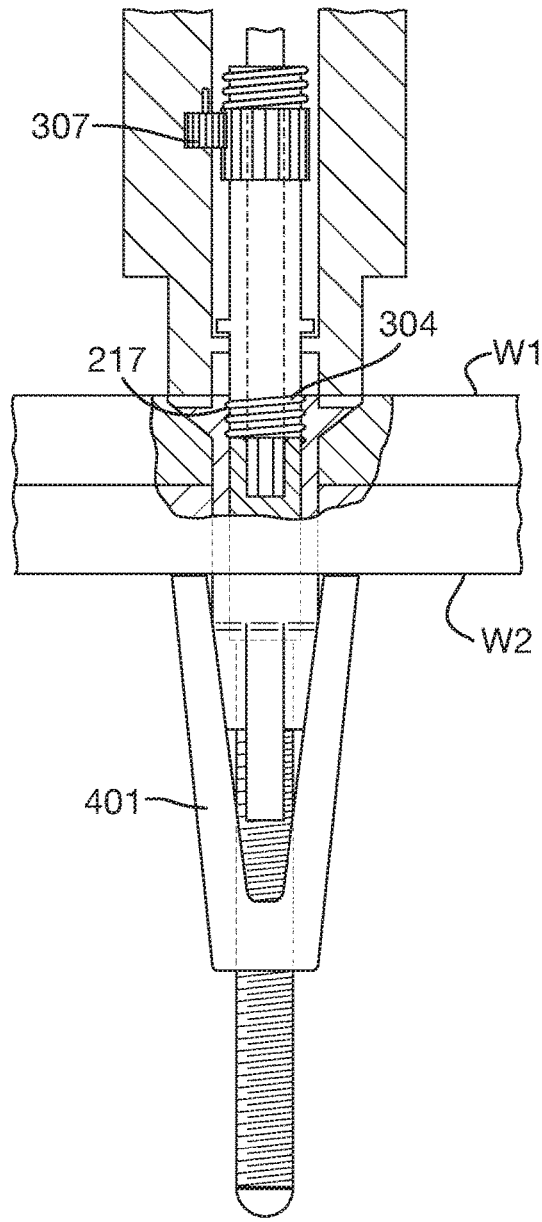

Motor M1 is then activated to rotate the cog 307 and therefore turn the griping collar 304, so that its external thread winds into the internal thread of the gripping region 217 of the fastener 200, until it is fully engaged, as shown in FIG. 4C.

Figure 4D:
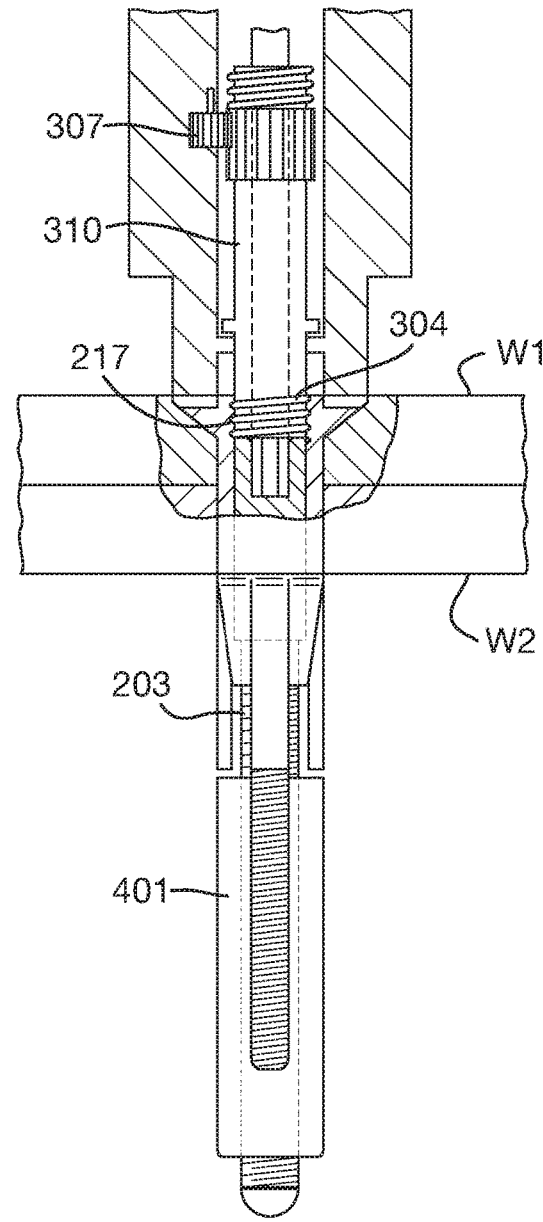

Motor M2 is then activated to rotate the shaft 310. As this is engaged with the hex recess 212 of the threaded member 203 of the fastener 200, it causes the threaded member to rotate and the legs 401 of the fastener to move away from the work-pieces W1, W2 and retract, so that they are narrower than the apertures in the work-pieces, as shown in FIG. 4D. The tool 300 can then be pulled away from the work pieces and it will bring the fastener 200 out of the apertures in the work-pieces with it. A substantial pulling force can be applied to the fastener 200 via the tool 300 because of the union between the gripping collar 304 of the tool and the gripping region 217 of the fastener. The tool could be operated by hand or could be mounted within a robotic system.

Figure 4E:
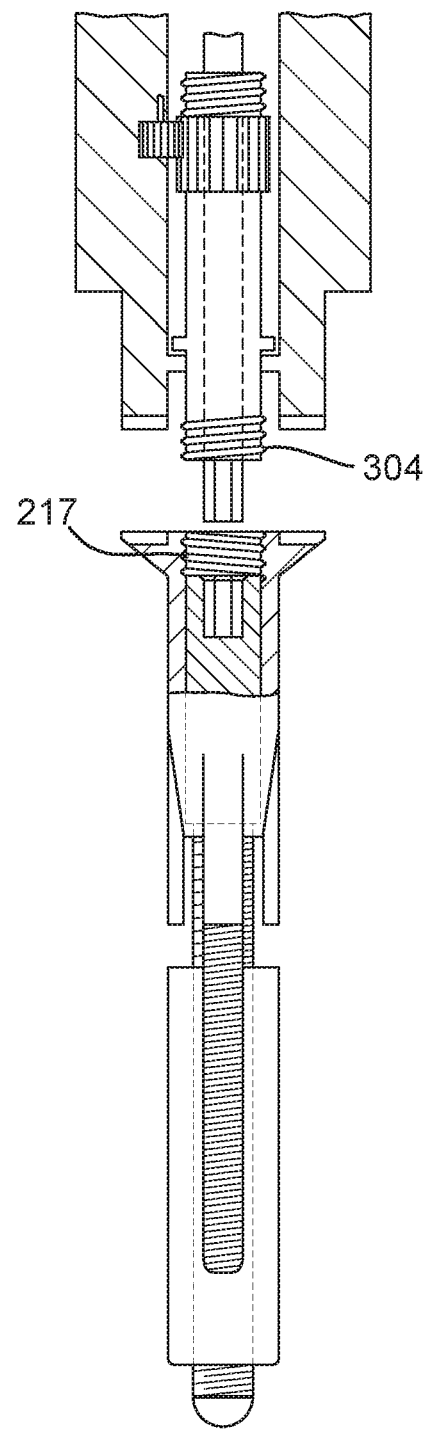

When the fastener 200 is clear of the work-pieces, the tool 300 can be disengaged from the fastener 200, as shown in FIG. 4E. Motor M1 is activated in the opposite direction, which unwinds the gripping collar 304 from the gripping region 217 of the fastener.

The components of the fastener are made of steel and could be produced using an additive process such as 3D printing. The fasteners are suitable for apertures ranging from 4 mm in diameter to 25 mm, although other diameters are possible. For a grip feature that uses a threaded recess, the pitch of the thread is for example between 0.4 mm to 2 mm.

The advantages of having a gripping head are that, a large pulling force can be applied to the fastener if it is stuck and the fastener can be handled more easily by robotic equipment, especially in flush-head form where ordinarily there are no other significant features to provide a grip.

Figure 5:
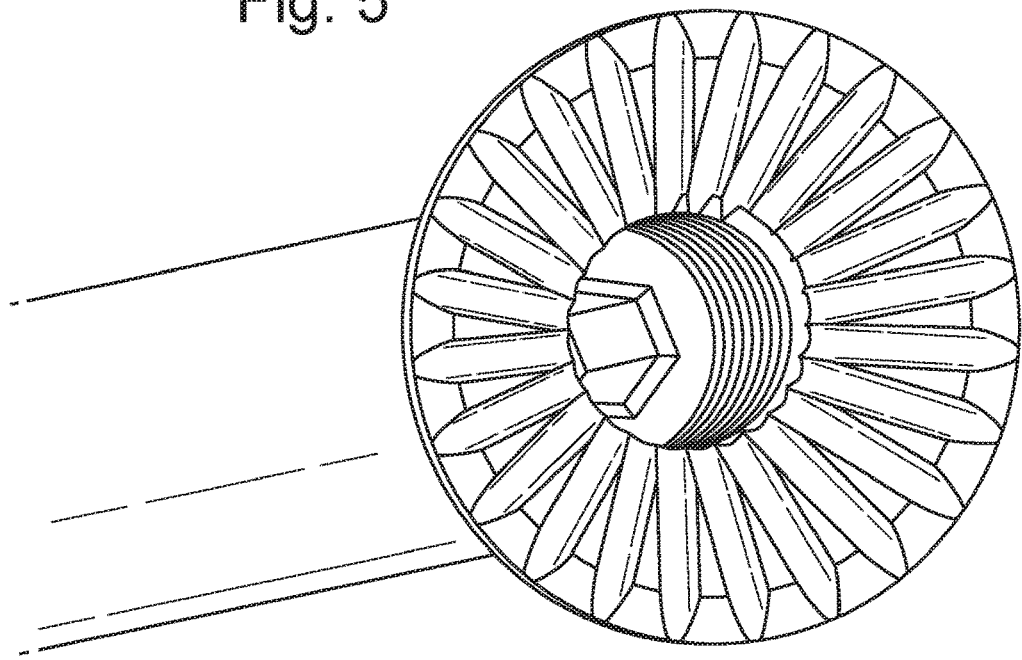
FIG. 5 is a perspective view of an embodiment of the fastener of FIG. 2A having a larger number of anti-rotation slots.

The anti-rotation features 207 can be of any suitable size and shape. Another example is shown in FIG. 5, where numerous radial slots are provided.

Figure 6:
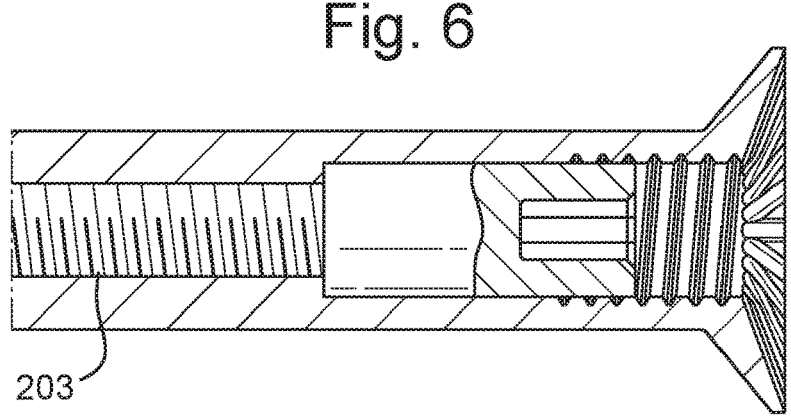
FIG. 6 is a cross-sectional view of an embodiment of the fastener of FIG. 2A having a gripping thread that reaches into the cavity of the head part of the fastener.
Figure 7:
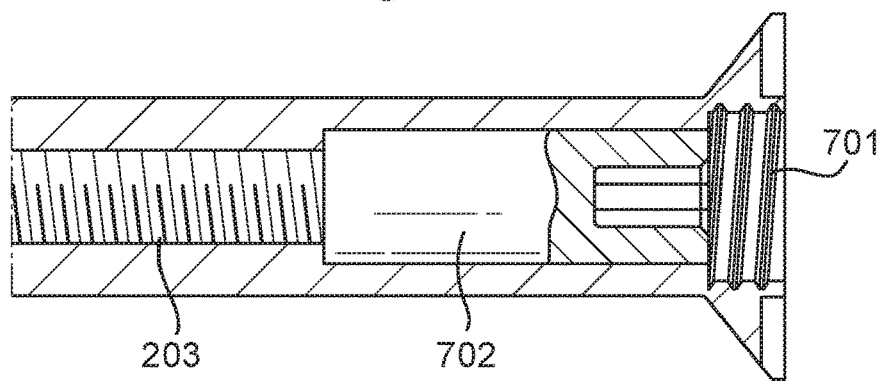
FIG. 7 is a cross-sectional view of an embodiment of the fastener of FIG. 2A having a wider diameter gripping region than the cavity of the head part of the fastener that receives the thread member.

The thread of the grip region 217 could extend into the smooth region 216, as shown in FIG. 6. FIG. 7 shows a further alternative configuration, where the grip region 701 of the threaded member 203 of the fastener 200 is of greater diameter than the smooth region 702.

Figure 8A:
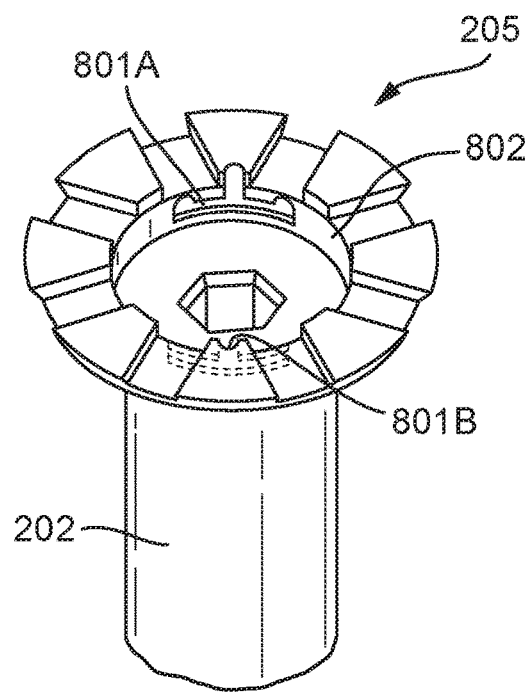
FIG. 8A is a perspective view of an embodiment of the fastener of FIG. 2A having an internal bayonet fitting in the head as a gripping feature.

FIG. 8A shows an alternative type of grip to the thread described above. A bayonet type fitting is provided in the head 205 of the dowelling part 201 of the fastener 200. The bayonet fitting comprises opposing channels 801A, 801B in the interior surface of the recess 802 of the dowelling part 201. The channels are arranged to receive protrusions in the gripping collar of the tool (not shown) to lock the tool and fastener together during installation and extraction of the fastener.

Figure 1A:
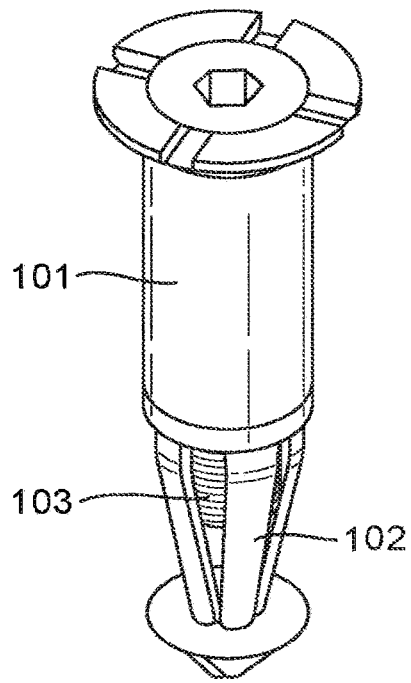
FIG. 1A is a perspective view of an example of a known fastener.
Figure 1B:
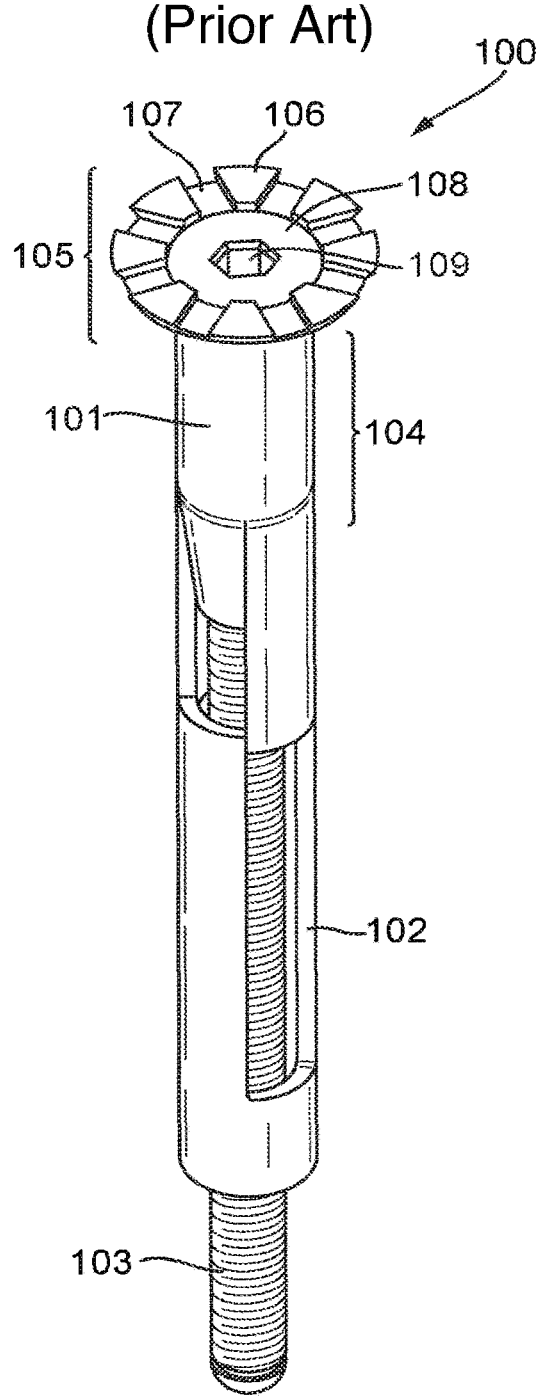
FIG. 1B is a perspective view of another example of a known fastener with a flush head.
Figure 1C:
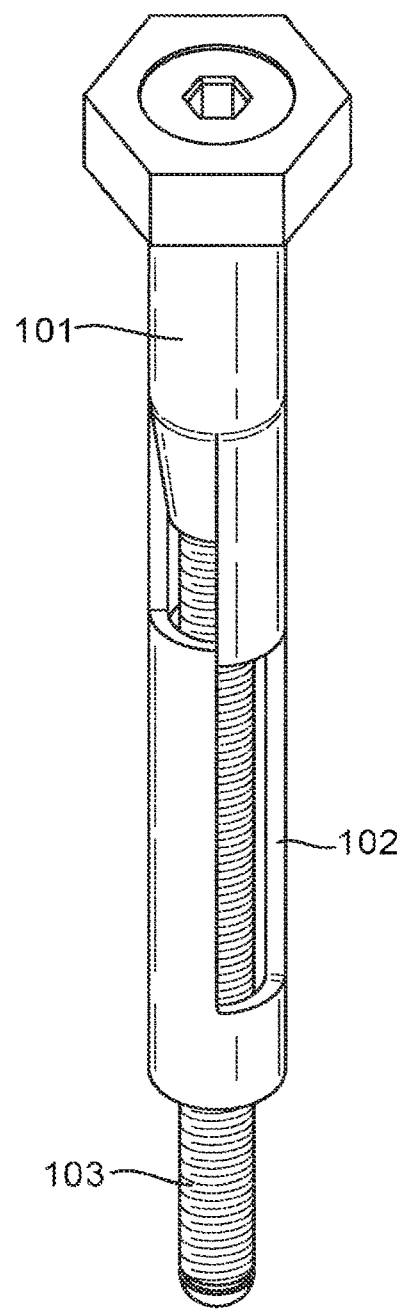
FIG. 1C is a perspective view of another example of a known fastener with a raised hexagonal head.
Figure 1D:
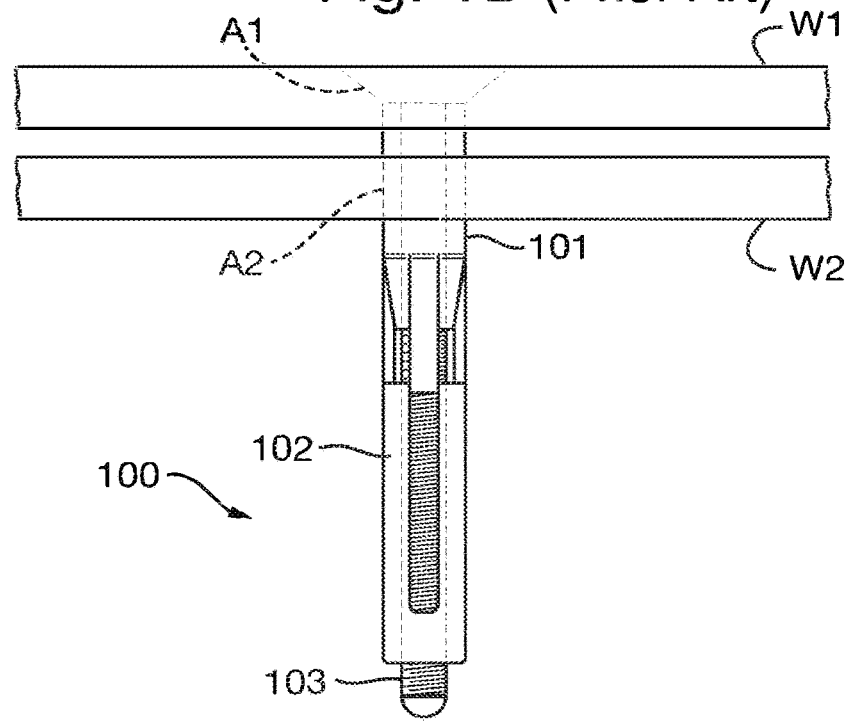
FIGS. 1D to 1G comprise a sequence of cross-sectional views showing the prior art fastener of FIG. 1B in use to fasten two work pieces together.
Figure 1E:
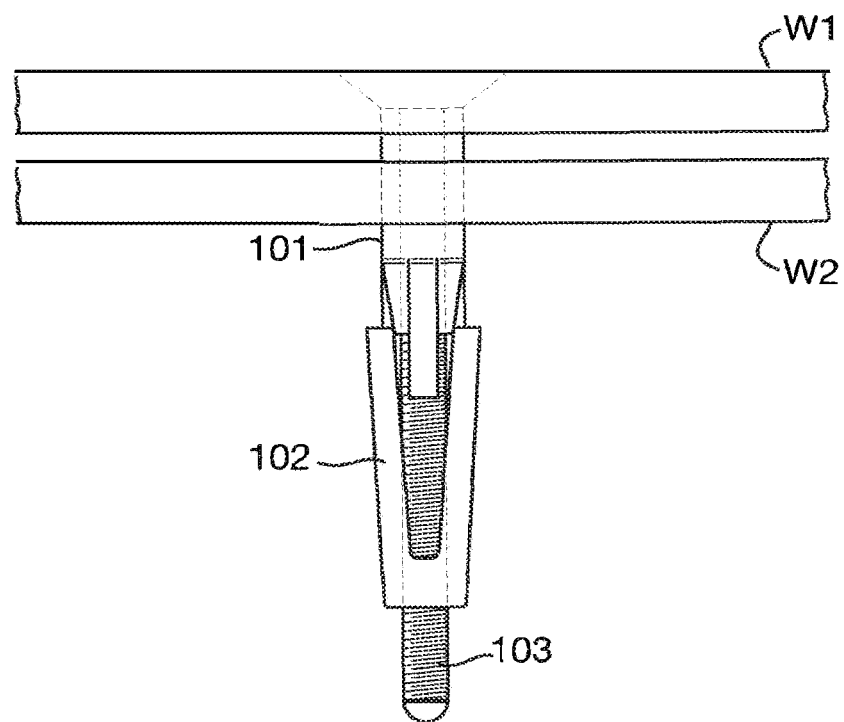
Figure 1F:
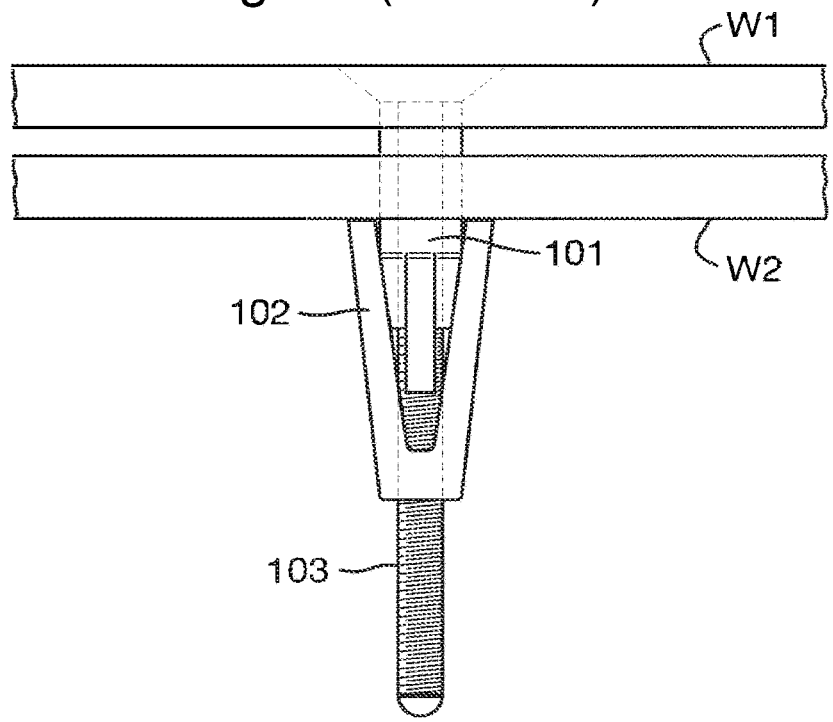
Figure 1G:
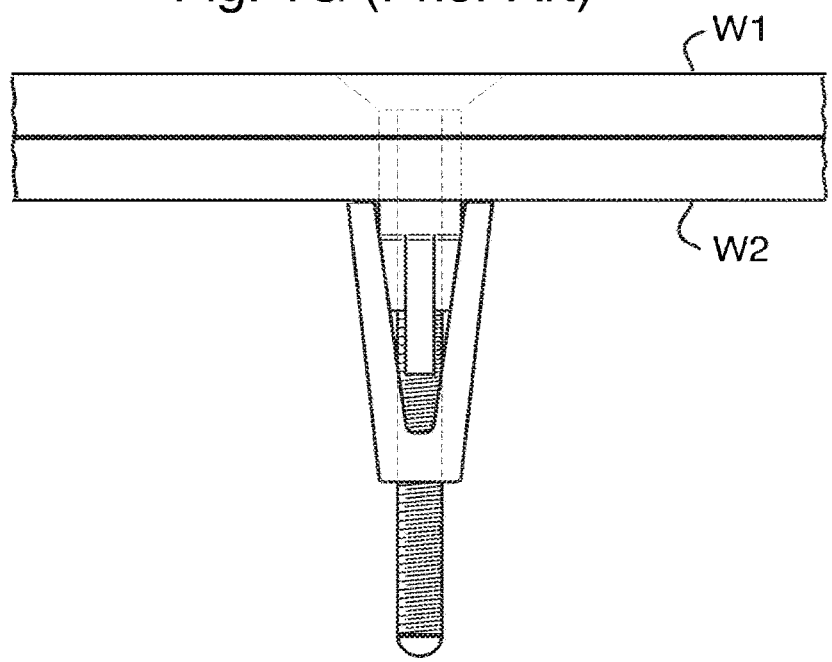
Figure 8B:
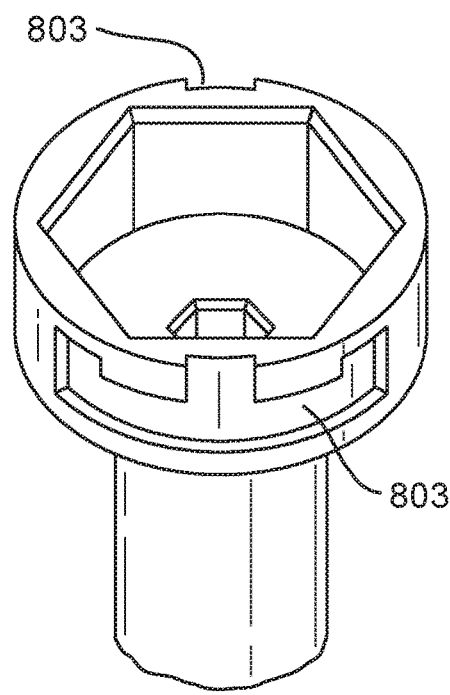
FIG. 8B is a perspective view of an embodiment of the fastener of FIG. 2A having an external bayonet fitting in the head as a gripping feature.

FIG. 8B shows another alternative type of grip, suitable for use with fasteners that have a head that stands proud of the work-pieces, such as that shown in FIG. 1C. A bayonet fitting comprising a series of opposing channels 802 is provided on the outside of the head 803. This allows the head 210 of the threaded member 203 to be wider and therefore a greater clamping load applied to the fastener 200. Also the channels of the bayonet can be deeper and therefore a greater pulling force applied to the fastener 200 to remove it from the apertures, if necessary. The corresponding features in the tool 300 are pins for locating with the channels. Alternatively the channels of the bayonet fitting could be provided in the collar 304 and pins provided as a grip feature in the head of the fastener.

Figure 8C:
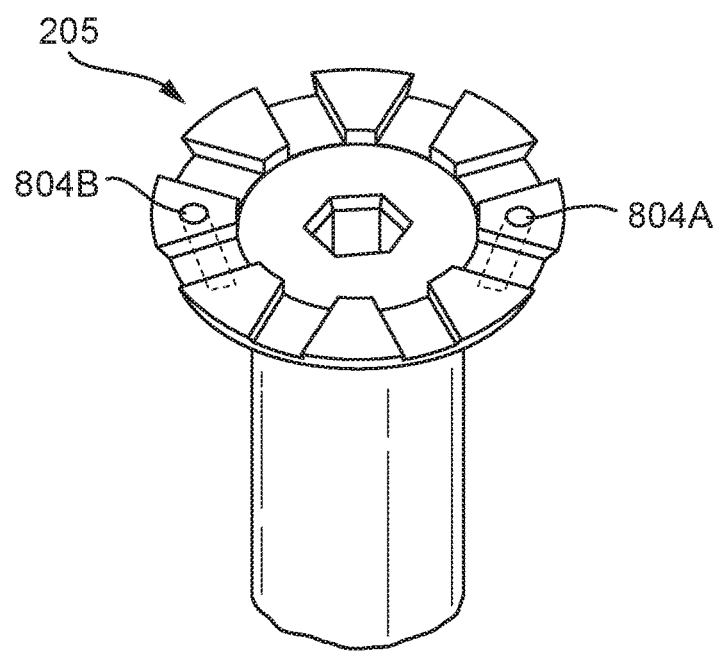

FIG. 8C shows another type of grip that can be used with flush head or proud fasteners. A plurality of angled recesses 804A, 804B are provided in the head 205 of the doweling part 201 of the fastener 200. The recesses are arranged to receive retractable prongs in a removal and installation tool (not shown).

A fastener-handling tool could be a simple thread or bayonet fitting to engage directly with the grip feature in the fastener and used to extract the fastener if it is stuck.

In a further embodiment, the mechanism for releasably locking the fastener and the tool together is electromagnetic. In this embodiment, the tool is provided with a coil connected to a switchable power supply. The coil is either mounted around the gripping collar 303, or the gripping collar could be omitted and the coil mounted around the outer sleeve 301. In this embodiment it is important that the fastener is made from a ferrous material. In operation, a fastener is offered up to the tool and the anti-rotation features aligned. Power is then provided to the coil to magnetise either the gripping collar or the outer sleeve of the tool. A current and coil configuration to provide a magnetic field strength of from 0.01-1.5 Tesla would be suitable, with the higher field strength used to securely hold larger fasteners. The fastener is then inserted into the aperture in the work-piece and the shaft 310 rotated to actuate the fastener and clamp the work-pieces. The power to the coil is then switched off and the tool retracted. The opposite procedure is used to extract the fastener.

The advantages of using an electromagnet include a simplified configuration of the tool and immediate attachment and detachment of the fastener to the tool without any moving parts.

The invention claimed is:

1. An apparatus comprising a removable blind fastener and a separate tool;
   wherein the removable blind fastener comprises a main body with a head, the head having a top surface, a clamping part axially aligned with and extending away from the head of the main body, and a threaded screw member axially aligned with and passing through the main body and directly engaging with a threaded part of the clamping part, such that turning the screw member causes the clamping part to move relative to the main body;
   wherein the head of the main body has a grip feature to allow the fastener to be mechanically locked to the tool during installation and removal of the fastener to prevent separation of the fastener and the tool during installation and removal of the fastener;
   wherein the tool is separated from the fastener upon installation or removal of the fastener;
   wherein the grip feature is provided in a recess in the top surface of the head and includes an undercut feature in a radial direction, perpendicular to the longitudinal axis of the fastener; and
   wherein when the tool is mechanically locked to the fastener during installation and removal of the fastener, the tool extends longitudinally away from the top surface of the head in an opposing direction to the screw member.

* * * * *